Inventor:
Walter R. Peterson

May 1, 1951 W. R. PETERSON 2,551,460
DRYING BARN FOR AGRICULTURAL CROPS
Filed May 6, 1949 3 Sheets-Sheet 2

Inventor:
Walter R. Peterson

May 1, 1951 W. R. PETERSON 2,551,460
DRYING BARN FOR AGRICULTURAL CROPS
Filed May 6, 1949 3 Sheets-Sheet 3
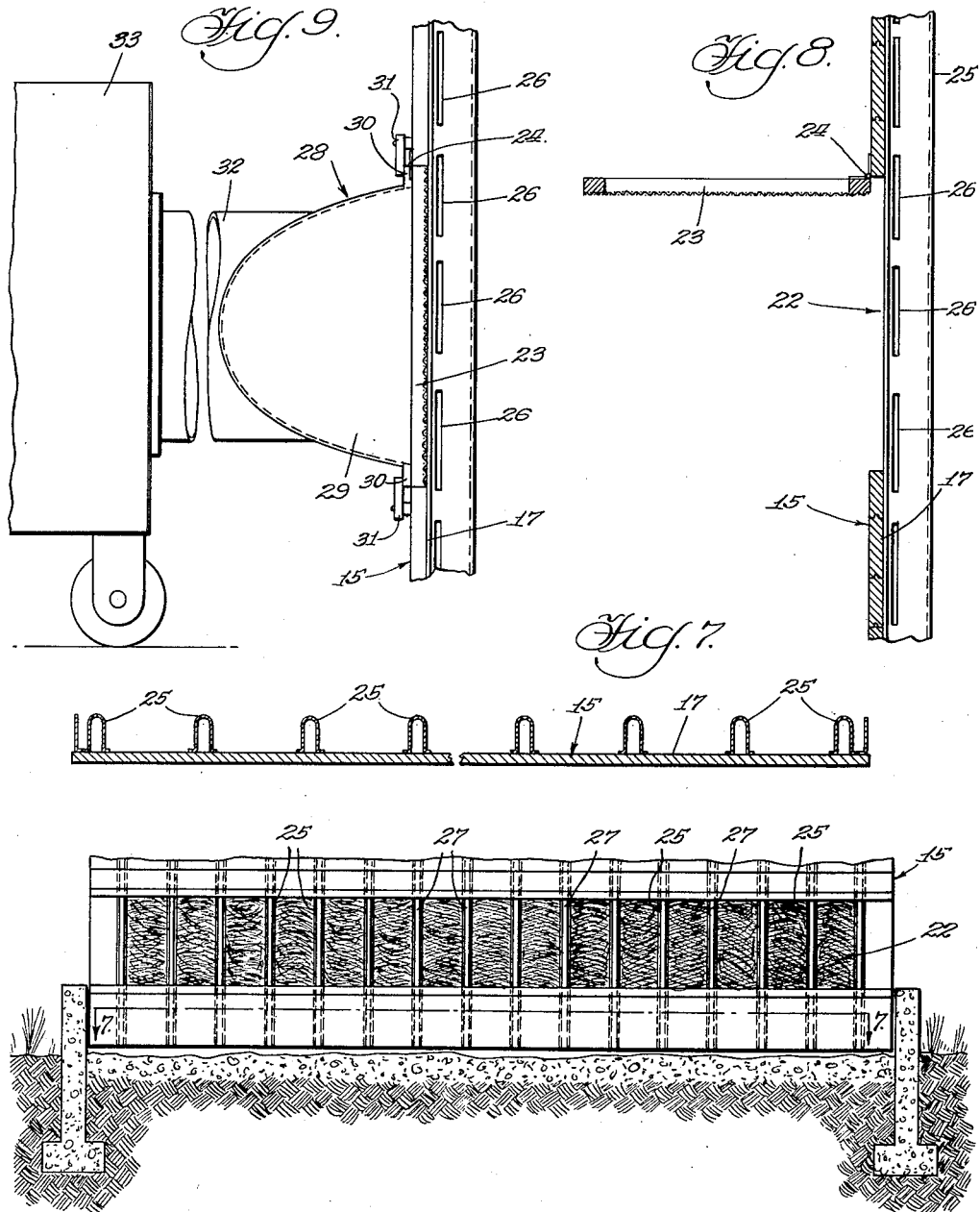

Patented May 1, 1951

2,551,460

UNITED STATES PATENT OFFICE 2,551,460

DRYING BARN FOR AGRICULTURAL CROPS

Walter R. Peterson, Hinsdale, Ill., assignor to International Harvester Company, a corporation of New Jersey Application May 6, 1949, Serial No. 91,803

10 Claims. (Cl. 98—54)

This invention relates to an improved storage establishment for containing and curing cattle feed. More particularly, the invention relates to a storage barn having an improved construction for drying cut cattle feed such as hay after it has been stored within the barn. A principal object of this invention is to provide an improved hay curing establishment having a novel form of construction wherein the chopped hay may be stored in a plurality of vertically extending sections and a drying mechanism for drying each section after it has been packed within the barn.

A still further object is to provide an improved drying barn for stored hay, the drying barn including an end wall and a movable wall which may be spaced from the end wall to a plurality of horizontal positions whereby cut hay may be stored in the barn in a plurality of vertically extending sections supported between the end wall and the movable wall.

Still another object is to provide a storage barn for storing cut vegetation such as hay, the storage barn including a movable wall which may be positioned in a plurality of longitudinally spaced positions, the wall being connected to a plenum chamber for directing heated air through the sections of chopped hay which are stored in the barn.

A still further object is the provision of a novel mechanism for drying sections of hay stored within a barn, the mechanism including novel provisions whereby a herd of animals may feed themselves without the attention of an operator.

These and other objects will become further apparent upon a reading of the description when examined in connection with the accompanying drawings, in which:

Fig. 6 is an end view of a portion of a movable wall arranged in a drying barn.

Fig. 7 is a sectional view taken substantially along the line 7—7 of Fig. 6.

Fig. 8 is a detail view of a portion of a movable door, the movable door including a hinged gate.

Fig. 9 is a detailed side elevational view of a portion of a movable door showing a drying mechanism connected thereto.

Figure 1:
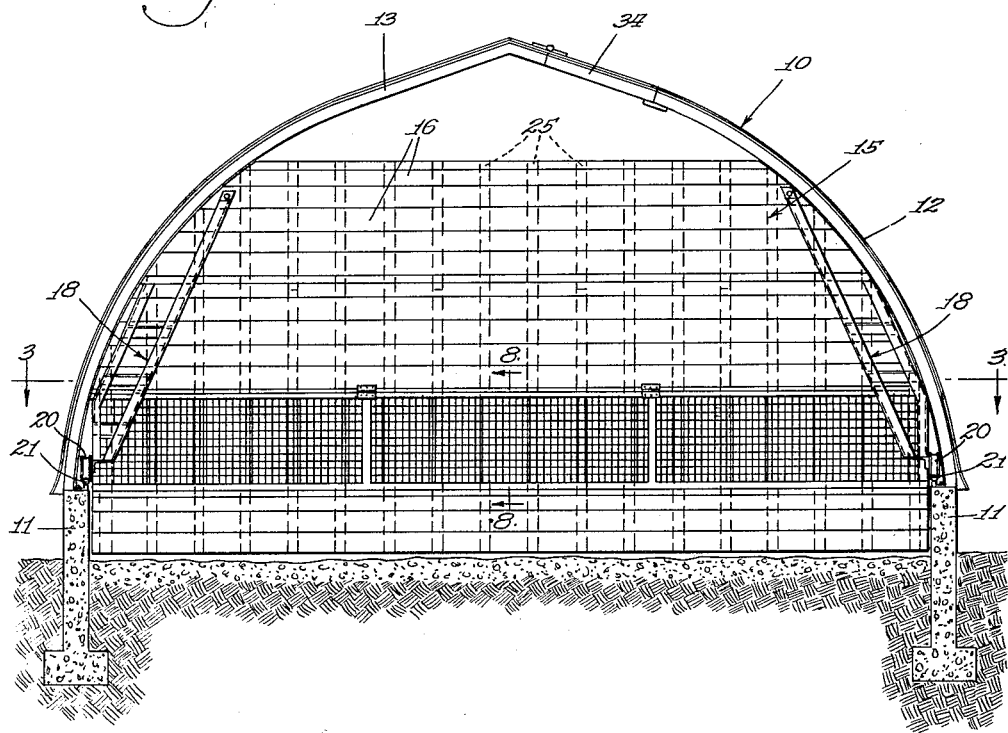
Fig. 1 is an end view in elevation showing a vegetation storing barn having an improved mechanism for drying the vegetation stored within the barn.
Figure 2:
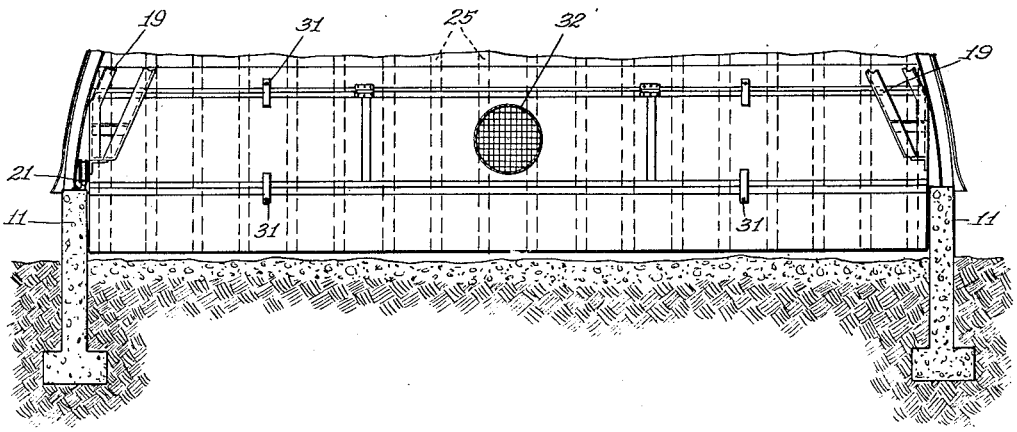
Fig. 2 is a view showing a portion of a drying mechanism arranged to supply heated air to vegetation stored within a barn.
Figure 3:
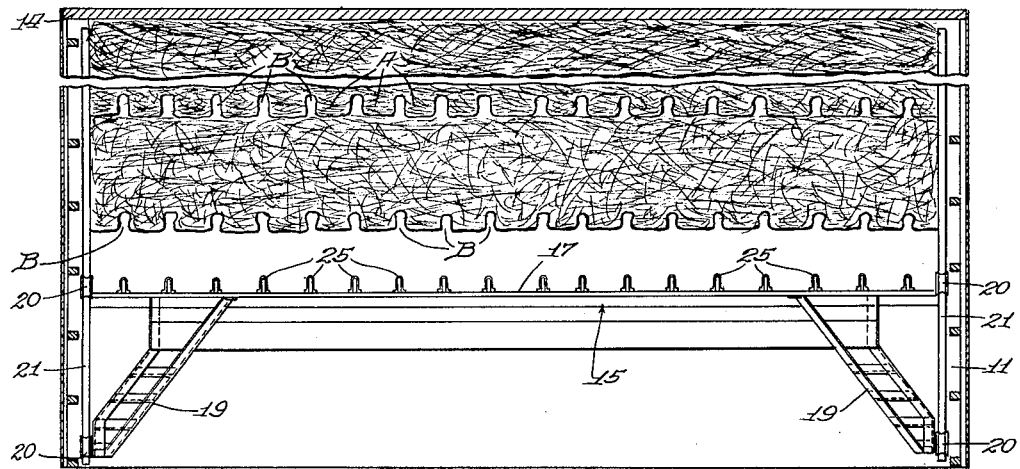
Fig. 3 is a sectional view of a drying barn taken substantially along the line 3—3 of Fig. 1.

A drying enclosure or barn is generally designated by the reference character 10. The barn 10 generally consists of a foundation structure 11 which is positioned to support an arched roof structure 12. The roof structure 12 may be conventionally supported by a plurality of wood or steel rafters 13, only one of which is shown in Fig. 1. The barn 10 includes a vertical end wall 14 best shown in Fig. 3. The end wall 14 is generally stationary and provides the end support for a quantity of cut feed that may be stored within the barn. A movable wall 15 is positioned within the barn 10 as best shown in Figs. 1, 3, 4 and 5. The movable wall 15 may be constructed from a plurality of boards 16 which are connected in end to end relation, thus providing a smooth inner face or surface 17. A wheel frame 18 is rigidly connected to the movable wall 15 for supporting said wall in a plurality of longitudinally spaced positions with respect to the end wall 14. The wheel frame 18 includes a pair of triangular frame structures 19, one of which is rigidly secured to the movable wall 15 at each of its lower ends. The triangular frame is provided with a plurality of rollers or track wheels 20 which are movably supported on a pair of laterally spaced tracks 21. The tracks 21, as best shown in Figs. 1 and 2, may consist of longitudinally extending pipes 21' which are rigidly secured to the upper ends of the foundation structure 11.

The movable wall 15 is provided near its lower end with a transversely extending opening 22 which extends substantially the complete width of the movable wall. The opening 22 is arranged to be covered by means of a gate 23 having a screen or reticulated surface. The gate 23 is hingedly connected as indicated at 24 to the movable wall 15. By virtue of the hinging construction the gate 23 may be raised and lowered over the opening 22 whenever so desired.

Figures 4, 5:
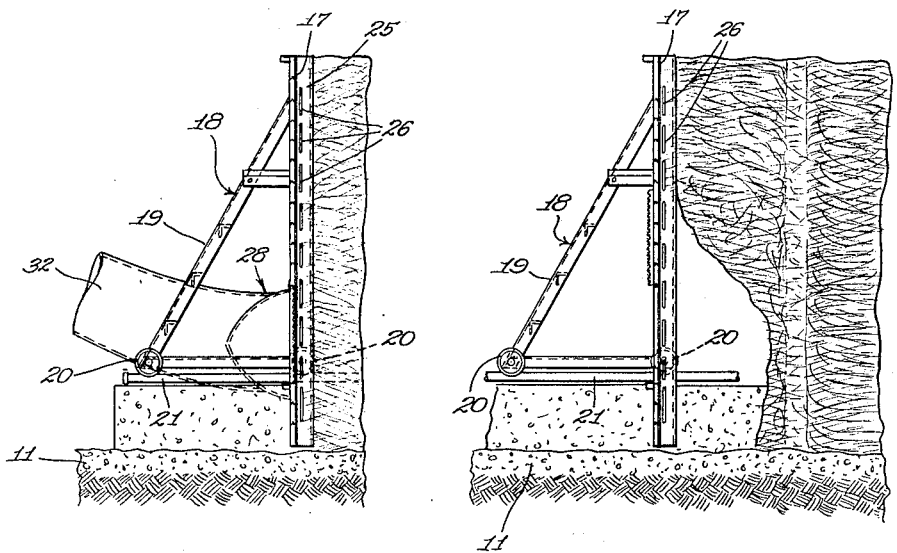
Fig. 4 is a side elevational view of a movable wall having a heating unit connected thereto for directing heated air to the interior of a drying barn.
Fig. 5 is a view showing a movable wall arranged to facilitate the feeding of a herd of animals.

As best shown in Figs. 4, 6 and 7 the movable wall 15 is provided with a plurality of vertically extending U-shaped ducts 25. The ducts 25 may be of metal construction and are connected to the smooth inner face 17 of the movable wall 15. As best shown in Figs. 4, 5 and 9 the ducts 25 are provided with a plurality of slots or heat vents 26 which are spaced substantially throughout the length of each duct. The open ends of the ducts 25 are closed by virtue of their connection with the movable wall 15. However, as best shown in Fig. 6, each of the ducts 25 is provided with an open end portion 27 which bridges over the opening 22 formed in the movable wall 15. The open end portions 27 are arranged over the opening 22 so that they are in direct communication with a plenum chamber 28 which is positioned over the opening 22 whenever the drying operation takes place. The plenum chamber 28 may be of canvas construction or it may be made of metal, whichever is more desirable for the particular purpose. The plenum chamber 28 consists of a hood 29. The hood 29 extends substantially the width of the opening 22 and is rigidly secured over the opening during the drying operation. A flange portion 30 projects outwardly from the upper and lower ends of the hood 29 and this flange is engaged by means of pivoted latches 31, as best shown in Figs. 2 and 9, securely connecting the plenum chamber 28 to the movable wall 15 during the drying operation. A duct 32 is connected to the plenum chamber 28 and this duct is adapted to direct heated air from a wheeled blower and heating unit 33. The blower and heating unit is not described in detail since any conventional type of unit may be utilized for directing sufficiently heated warm air to the plenum chamber 28.

The roof 12 of the barn is provided with a door 34 which may be opened for the admission of cut vegetation.

The drying barn 10 is particularly adapted for the drying of cut hay. In order to store the first section of hay within the barn the farmer moves the movable wall 15 longitudinally until it is spaced a relatively short distance from the stationary or end wall 14. The space may be anywhere from three to five feet, depending on the amount of hay which is to be stored during that particular operation. The cut hay is usually considerably moist and damp and it may be directed to the barn through the door 34 whereupon it is delivered into the space formed between the movable wall 15 and the end wall 14. After this space has been completely filled up and packed a vertical section of hay designated by the reference character A is provided. The movable wall 15 is tightly pressed against the hay and thus the vertical extending ducts 25 project inwardly into the section of hay A to form a plurality of vertically extending depressions B. It is desired to dry each section of hay as soon as possible after it has been stored and for this purpose the plenum chamber 29 is attached over the opening 22. The screen gate 23 has been lowered into place over the opening and thus hay is prevented from entering into the plenum chamber. The heating device 33 is set in operation and a blower (not shown) within the device directs heated air into the plenum chamber. The plenum chamber therefore distributes the air throughout the hay and particularly into the open end portions 27 whereupon it enters into the ducts 25 and is distributed outwardly through the vents 26. The operation continues until the hay has been sufficiently dried, whereupon another section of hay may be built up within the enclosure by merely moving the movable wall 15 a spaced distance from the previously treated section of hay.

After the movable wall has thus been moved the previously treated section of hay still contains the vertically extending depressions B which were formed by means of the vertical ducts 25. The operator thereupon compresses another vertical section of hay in the space formed by the end of the previously treated section and the movable wall. After a new section of hay has thus been formed the drying operation is again repeated by means of the plenum chamber. The heated air passes through the section to be treated and the heated air is exhausted by means of the depressions B formed in the previously treated section of hay.

In can readily be seen that by this method hay may be efficiently treated and a thorough drying operation is obtained since the heated air will only have to be blown a relatively short distance throughout the hay, thus assuring that the whole section is properly dried. If it becomes necessary to place several columns of hay in storage on the same day the drying operation can also easily be accomplished. In this case it is only necessary to prevent the heated air from moving upward throughout the depressions B by mutilating the upper surface of the hay downwardly several feet so that the open ends of the depressions are closed. In general, however, the practice most desirable would be to treat the hay in sections, whereupon it can readily be seen a successful drying operation results. The novel arrangement of the drying mechanism and its relation to the movable wall 15 is particularly well adapted for the self-feeding of a small herd of animals. When it is desired to feed the animals the plenum chamber 29 is removed by disengaging the latches 31 from the flanges 30. The screen gate 23 is thereupon hinged upwardly so that the opening 22 is exposed. The cattle are then brought into the barn and they may feed through the spaces formed by the open end portions 27 of the U-shaped ducts. As the cattle feed on the dried hay they will undermine the upper section of the hay and this hay will subsequently fall down and be fed upon. It can readily be seen that the arrangement provides for a novel self-feeding of the cattle since the animals will push forwardly against the movable door 15, thereupon moving the door against the remaining sections of hay, whereupon the cattle may feed until the vegetation has been consumed.

By this type of arrangement the cattle may readily be fed without the involved attention of the operator. In dairy farms, for instance, the self-feeding system would mean that a dairy farmer would only have to bed the cattle in a loafing barn and provide a milking parlor for them. Whenever necessary the animals would enter the barn for their feeding. The storing of the hay in vertically extending sections permits the ready self-feeding since the undermined feed remaining at the top of the section will readily and quickly drop down for subsequent consumption. This clearly could not be accomplished if the hay were stored in one mass since the cattle would feed into the mass until an arch of feed remained which would not fall or drop in the desired manner.

It can thus be seen that an improved storage barn has been provided, the procedure for storing the hay facilitating the subsequent drying and feeding operation. It must be understood that various changes and modifications may be made in the construction which do not depart from the spirit of the invention as disclosed nor the scope thereof as defined in the appended claims.

What is claimed is:

1. A material treating device comprising a longitudinally extending enclosure having a vertical end wall, a second vertical wall, said second wall extending substantially parallel to the first wall within the enclosure, means adapted to move said second wall longitudinally with respect to said end wall including a wheeled carriage supporting the second wall, a track within the enclosure for supporting the wheeled carriage, said enclosure having a material receiving opening whereby material to be treated may be directed to and packed between said walls, a plurality of laterally spaced vertically extending U-shaped ducts connected to the second wall, each duct being provided with a plurality of heating vents, said second wall including a transverse opening extending substantially the width of said second wall, said ducts having open end portions bridging the opening and being directly in communication therewith, a reticulated gate hingedly connected to the second wall and adapted to be moved over said opening, a plenum chamber removably connected over said opening, and heating means communicating with the plenum chamber for directing heated air thereto, the heated air being exhausted through the heat vents of the vertical ducts into the material to be treated for drying the same.

2. A material storing device comprising a longitudinally extending enclosure having a stationary vertical end wall, a movable wall within the enclosure, said movable wall including an inner substantially flat vertical surface extending substantially parallel with said stationary wall, a pair of track members positioned on said enclosure at laterally spaced sides thereof, a wheeled frame supported on said track members, said movable wall being supported on said wheel frame whereby the movable wall may be moved longitudinally with respect to said stationary wall, said enclosure including a material receiving opening whereby material to be treated may be directed to and packed between the walls of the enclosure, a plurality of U-shaped vertically extending ducts connected to the inner vertical surface of the movable wall, said ducts being transversely spaced with respect to each other and including a plurality of heat vents, each duct being arranged to project inwardly into the material to be treated and forming therein a plurality of vertically extending depressions, said movable wall having a transverse opening extending substantially the width of the wall, a removable reticulated gate over said opening, said ducts having an open end portion bridging the opening in said movable wall, a plenum chamber connected over said opening, heating means for supplying heated air to said plenum chamber whereby heated air is directed to said ducts, said wall being movable to a plurality of positions for successively drying individual vertical extending sections of material, the vertically extending depressions of each previously treated section providing exhaust outlets for the heated air.

3. A material storing device comprising a longitudinally extending enclosure having a stationary vertical end wall, a movable wall within the enclosure, said movable wall including an inner substantially flat vertical surface, a pair of track members positioned on said enclosure at laterally spaced sides thereof, a wheeled frame supported on said track members, said movable wall being supported on said wheel frame whereby the movable wall may be moved longitudinally with respect to said stationary wall, said enclosure including a material receiving opening whereby material to be treated may be directed to and packed between the walls of the enclosure, a plurality of vertically extending ducts connected to the inner vertical surface of the movable wall, said ducts being transversely spaced with respect to each other and including a plurality of heat vents, each duct being arranged to project inwardly into the material to be treated and forming therein a plurality of vertically extending depressions, said movable wall having a transverse opening, a removable reticulated gate over said opening, said ducts having an open end portion bridging the opening in said movable wall, a plenum chamber connected over said opening, heating means for supplying heated air to said plenum chamber whereby heated air is directed to said ducts, said wall being movable to a plurality of positions for successively drying individual vertical extending sections of material, the vertically extending depressions of each previously treated section providing exhaust outlets for the heated air.

4. A material treating device comprising a longitudinally extending enclosure having a vertical end wall, a movable vertical wall, said movable wall extending substantially parallel to the first wall within the enclosure, means adapted to move said movable wall longitudinally with respect to said end wall including a wheeled carriage supporting the movable wall, said enclosure having a material receiving opening whereby material to be treated may be directed to and packed between said walls, a plurality of laterally spaced vertically extending ducts connected to the movable wall, each duct being provided with a plurality of heating vents, said movable wall including a transversely extending opening, said ducts having open end portions bridging the opening and being directly in communication therewith, a reticulated gate hingedly connected to the second wall and adapted to be moved over said opening, a plenum chamber removably connected over said opening, and heating means communicating with the plenum chamber for directing heated air thereto, the heated air being exhausted through the heat vents of the vertical ducts into the material to be treated for drying the same.

5. A material treating device comprising a longitudinally extending enclosure having a vertical end wall, a movable vertical wall having a substantially flat inner surface, a wheeled frame for supporting said movable wall, a plurality of transversely spaced vertically extending heating ducts connected to the inner surface of the movable wall, the heating ducts being arranged to project into a section of material packed between the end wall and the movable wall thereby providing in said material a plurality of vertically extending depressions, said movable wall being movable to a plurality of longitudinally spaced positions with respect to the end wall whereby a plurality of sections of material may be packed between the walls and individually treated, said movable wall including a transversely extending opening positioned adjacent the lower end of the movable wall, a reticulated gate over said opening, a plenum chamber extending substantially the width of said opening, said ducts including openings in communication with the plenum chamber, heat vents extending substantially throughout the lengths of said ducts for delivering heated air through packed material, and means for supplying heated air to said plenum chamber whereby heated air is supplied to the section of packed material immediately adjacent the movable wall, the vertically extending depressions of the previously treated sections providing exhaust outlets for the heated air.

6. A material treating device comprising a longitudinally extending enclosure having a vertical end wall, a movable vertical wall having a substantially flat inner surface, a wheeled frame for supporting said movable wall, a plurality of transversely spaced vertically extending heating ducts connected to the inner surface of the movable wall, the heating ducts being arranged to project into a section of material packed between the end wall and the movable wall, thereby providing in said material a plurality of vertically extending depressions, said movable wall being movable to a plurality of longitudinally spaced positions with respect to the end wall whereby a plurality of sections of material may be packed between the walls and individually treated, said movable wall including a transversely extending opening positioned adjacent the lower end of the movable wall, a plenum chamber extending substantially the width of said opening, said ducts including openings in communication with the plenum chamber, heat vents extending substantially throughout the lengths of said ducts for delivering heated air through packed material, and means for supplying heated air to said plenum chamber whereby heated air is supplied to the section of packed material immediately adjacent the movable wall, the vertically extending depressions of the previously treated section providing exhaust outlets for the heated air.

7. A material drying device comprising a longitudinally extending enclosure having a vertical end wall, a movable wall having a substantially flat inner surface, a plurality of spaced heating ducts connected to the inner surface of the movable wall, the heating ducts being arranged to project into a section of material packed adjacent the end wall, thereby providing in said material a plurality of spaced depressions, means movably supporting said movable wall, the movable wall being positionable at a plurality of longitudinally spaced positions with respect to said end wall whereby a plurality of vertically extending sections may be packed between the walls of the enclosure and individually dried, said movable wall including a transversely extending opening, each of said ducts having an open portion substantially bridging the transversely extending opening, a plenum chamber in communication with the opening and the heating ducts, and heating vents in the ducts for distributing heated air to a section of material packed adjacent the movable wall, the spaced depressions of a previously dried section of material providing exhaust outlets for heated air as it leaves the dried material.

8. A material drying device comprising a longitudinally extending enclosure adapted to enclose a plurality of vertically extending individual sections of material arranged to be dried, a movable wall having a substantially flat inner surface arranged to engage and support an end section of the material, a plurality of spaced heating ducts connected to and projecting from the inner surface of the movable wall, the ducts being arranged to project into an end section of material thereby providing in said section a plurality of depressions, a frame movably supporting the movable wall at a plurality of longitudinal positions within said enclosure, a heating unit connected to said movable wall, and means directing heated air from said unit to said heating ducts, said ducts including outlets for distributing heated air to the material to be dried, the depression of a previously dried section providing exhaust outlets for the heated air.

9. A material drying device comprising a longitudinally extending enclosure having an end wall, a movable wall arranged to be moved to a plurality of horizontally spaced positions with respect to the end wall whereby material to be dried may be spaced between said walls, a plurality of heating ducts projecting outwardly from the movable wall into the material to be dried, said ducts thereby forming in said material a plurality of depressions, and heating means for supplying heated air to said ducts, said ducts including vents for distributing heated air to the material for drying the same.

10. A material storing device comprising a longitudinally extending enclosure having a vertical end wall, a movable wall adapted to be positioned at a plurality of longitudinally spaced positions with respect to the end wall, said movable wall including a substantially flat inner surface, a plurality of vertically extending ducts connected to the inner surface of the movable wall, said ducts being arranged to project inwardly into material packed between the end and movable walls thereby leaving vertically extending depressions in said material, a source of heated air, means connecting the source with the ducts and vent means on said ducts for directing heated air throughout the material to be dried.

WALTER R. PETERSON.

REFERENCES CITED

The following references are of record in the file of this patent:

UNITED STATES PATENTS

| Number | Name | Date |
|---|---|---|
| 295,643 | Jennings | Mar. 25, 1884 |
| 440,369 | Saucerman | Nov. 11, 1890 |
| 445,162 | Coffin et al. | Jan. 27, 1891 |
| 1,045,125 | Dain | Nov. 26, 1912 |
| 1,535,374 | Pfister | Apr. 28, 1925 |